United States Patent
Klein et al.

(10) Patent No.: US 12,429,000 B2
(45) Date of Patent: Sep. 30, 2025

(54) ELONGATED JOURNAL BEARING FOR HIGH GEAR RATIO EPICYCLIC FAN DRIVE GEAR SYSTEM

(71) Applicant: RTX CORPORATION, Farmington, CT (US)

(72) Inventors: Mark A. Klein, Columbus, OH (US); Michael E. McCune, Colchester, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/446,088

(22) Filed: Aug. 8, 2023

(65) Prior Publication Data

US 2025/0052202 A1   Feb. 13, 2025

(51) Int. Cl.
| | |
|---|---|
| F02C 7/36 | (2006.01) |
| F02C 7/06 | (2006.01) |
| F16H 57/04 | (2010.01) |
| F16H 57/08 | (2006.01) |

(52) U.S. Cl.
CPC .............. *F02C 7/36* (2013.01); *F02C 7/06* (2013.01); *F16H 57/0479* (2013.01); *F16H 57/08* (2013.01); F05D 2220/36 (2013.01); F05D 2240/50 (2013.01); F05D 2260/40311 (2013.01); F05D 2260/98 (2013.01); *F16H 2057/085* (2013.01)

(58) Field of Classification Search
CPC .......... F02C 7/06; F02C 7/36; F16H 57/0479; F16H 57/08; F16H 57/085; F16H 2057/085
See application file for complete search history.

(56) References Cited

U.S. PATENT DOCUMENTS

| | | | | |
|---|---|---|---|---|
| 5,102,379 | A * | 4/1992 | Pagluica | F16H 57/082 475/159 |
| 6,017,184 | A | 1/2000 | Aguilar et al. | |
| 6,964,155 | B2 * | 11/2005 | McCune | F16C 23/041 475/331 |
| 9,732,800 | B2 | 8/2017 | Deng et al. | |
| 10,683,773 | B2 * | 6/2020 | Savaria | F16H 57/0479 |
| 11,041,562 | B2 * | 6/2021 | Lemoine | F16H 57/043 |
| 11,209,045 | B2 | 12/2021 | Brillon et al. | |
| 11,592,103 | B2 * | 2/2023 | Simard-Bergeron | F16H 57/082 |
| 11,739,829 | B2 * | 8/2023 | Beck | F02C 7/36 475/159 |

(Continued)

OTHER PUBLICATIONS

Extended European Search Report for European Application No. 24192933.0 mailed Dec. 23, 2024.

*Primary Examiner* — Sabbir Hasan
*Assistant Examiner* — Wesley Le Fisher
(74) *Attorney, Agent, or Firm* — Carlson, Gaskey & Olds, P.C.

(57) ABSTRACT

A fan drive gear system for a turbine engine includes a gear system with a plurality of compound intermediate gears that each include a first gear portion and a second gear portion. The second gear portion includes a forward gear portion and an aft gear portion and a ring gear assembly includes a forward ring gear that is engaged to the forward gear portion and an aft ring gear that is engaged to the aft gear portion. A carrier supports rotation of the plurality of intermediate gears with a plurality of corresponding journal bearing assemblies.

16 Claims, 8 Drawing Sheets

(56) References Cited

U.S. PATENT DOCUMENTS

| | | |
|---|---|---|
| 11,821,364 B2* | 11/2023 | Martin ................ F16H 57/0479 |
| 12,084,981 B2* | 9/2024 | Simard-Bergeron ........................ F16C 32/0659 |
| 2019/0360356 A1 | 11/2019 | Savaria et al. |
| 2020/0300340 A1 | 9/2020 | Desjardins |
| 2020/0332721 A1* | 10/2020 | Simon ........................ F16H 1/28 |
| 2021/0239013 A1* | 8/2021 | Simard-Bergeron ........................ F16H 57/0479 |
| 2021/0254659 A1* | 8/2021 | Brillon .................... F16C 17/02 |
| 2022/0145806 A1* | 5/2022 | Beck ........................ F16H 1/28 |
| 2023/0358178 A1* | 11/2023 | Desjardins ................ F02K 3/06 |

* cited by examiner

ELONGATED JOURNAL BEARING FOR HIGH GEAR RATIO EPICYCLIC FAN DRIVE GEAR SYSTEM

BACKGROUND

A turbine engine typically includes a fan section, a compressor section, a combustor section and a turbine section. A speed reduction device such as an epicyclical gear assembly may be utilized to drive the fan section such that the fan section may rotate at a speed different than the turbine section so as to increase the overall propulsive efficiency of the engine. A carrier may support a plurality of planetary gears and rotate about an engine axis. Rotation of the carrier can present challenges for supporting and communicating lubricant to the planetary gears. Turbine engine manufacturers continue to seek further improvements to engine performance including improvements to thermal, transfer and propulsive efficiencies.

SUMMARY

A fan drive gear system for a turbine engine according to an exemplary embodiment of this disclosure includes, among other possible things, a sun gear that is configured to be driven by an engine shaft rotatable about an axis, a plurality of compound intermediate gears, each of the plurality of intermediate gears includes a first gear portion and a second gear portion, the second gear portion includes a forward gear portion and an aft gear portion, a ring gear assembly that includes a forward ring gear that is engaged to the forward gear portion and an aft ring gear that is engaged to the aft gear portion, a carrier that supports rotation of the plurality of intermediate gears, and a plurality of journal bearing assemblies that correspond with the plurality of intermediate gears, each of the plurality of journal bearing assemblies includes a ratio of a journal length to a journal diameter that is between 1.5 and 6.

In a further embodiment of the foregoing fan drive gear system, the ring gear assembly is fixed to a static engine structure and the carrier is rotatable about the axis.

In a further embodiment of any of the foregoing fan drive gear systems, the ring gear assembly includes a forward web portion that supports the forward ring gear and an aft web portion that supports the aft ring gear and each of the forward web portion and the aft web portion include an axial width that is between 10% and 25% of an axial width of each of the forward ring gear and the aft ring gear.

In a further embodiment of any of the foregoing fan drive gear systems, an axial clearance between the first gear portion and each of the forward ring gear and the aft ring gear is greater than about 0.08 inches.

In a further embodiment of any of the foregoing fan drive gear systems, each of the plurality of journal bearings includes a forward portion that supports the forward gear portion, an aft portion that supports the aft gear portion, and a middle portion.

In a further embodiment of any of the foregoing fan drive gear systems, each of the plurality of compound intermediate gear include at least one lubricant exhaust opening between the forward gear portion and the aft gear portion.

In a further embodiment of any of the foregoing fan drive gear systems, each of the forward portion and the aft portion includes a gear bearing surface with an axial width that matches an axial width of a corresponding one of the forward gear portion and the aft gear portion.

In a further embodiment of any of the foregoing fan drive gear systems, each of the forward portion and the aft portion includes a gear bearing surface with an axial width that is greater than an axial width of the corresponding one of the forward gear portion and the aft gear portion.

In a further embodiment of any of the foregoing fan drive gear systems, each of the forward portion and the aft portion include an outer undercut and an inner undercut. The outer undercut faces axially outward and the inner undercut faces axially inward toward the middle portion. The outer undercut and the inner undercut have equal axial lengths.

In a further embodiment of any of the foregoing fan drive gear systems, each of the forward portion and the aft portion include an outer undercut and an inner undercut. The outer undercut faces axially outward and the inner undercut faces axially inward toward the middle portion. An axial length of the inner undercut is different than that of the outer undercut.

In a further embodiment of any of the foregoing fan drive gear systems, each of the forward portion and the aft portion include an outer undercut and an inner undercut. The outer undercut faces axially outward and the inner undercut faces axially inward toward the middle portion. A radial thickness of the inner undercut is different than that of the outer undercut.

In a further embodiment of any of the foregoing fan drive gear systems, each of the forward portion and the aft portion include an outer undercut and an inner undercut. The outer undercut faces axially outward and the inner undercut faces axially inward toward the middle portion. A radial thickness of the inner undercut and the outer undercut are the same.

In a further embodiment of any of the foregoing fan drive gear systems, the middle portion includes a bearing surface that supports the first gear portion.

In a further embodiment of any of the foregoing fan drive gear systems, the middle portion includes an outer diameter that is less than each of the forward portion and the aft portion.

In a further embodiment of any of the foregoing fan drive gear systems, each of the plurality of journal bearing assemblies includes a lubricant supply holes that are configured to transfer lubricant to an interface with an inner surface of a corresponding one of the plurality of compound intermediate gears.

A turbine engine assembly according to another exemplary embodiment of this disclosure includes, among other possible things, a static engine structure, a fan section that includes a plurality of blades that are rotatable about an axis and a fan drive gear system that includes a sun gear that is configured to be driven by an engine shaft that is rotatable about the axis and a plurality of compound intermediate gears. Each of the plurality of intermediate gears includes a first gear portion and a second gear portion. The second gear portion includes a forward gear portion and an aft gear portion. A ring gear assembly includes a forward ring gear that is engaged to the forward gear portion and an aft ring gear that is engaged to the aft gear portion. The ring gear assembly is fixed to the engine static structure. A carrier supports rotation of the plurality of intermediate gears, the carrier is rotatable about the axis. A plurality of journal bearing assemblies correspond with the plurality of intermediate gears, each of the plurality of journal bearing assemblies includes a ratio of a journal length to a journal diameter that is between 1.5 and 6 and each of the plurality of journal bearing assemblies includes a lubricant supply holes that are configured to communicate lubricant to an interface with an inner surface of a corresponding one of the plurality of compound intermediate gears, and a fan drive shaft that is coupled to the carrier.

In a further embodiment of the foregoing turbine engine assembly, the ring gear assembly includes a forward web portion that supports the forward ring gear and an aft web portion that supports the aft ring gear and each of the forward web portion and the aft web portion include an axial width that is between 10% and 25% of an axial width of each of the forward ring gear and the aft ring gear.

In a further embodiment of any of the foregoing turbine engine assemblies, each of the plurality of journal bearings includes a forward portion that supports the forward gear portion, an aft portion supports the aft gear portion, and a middle portion and each of the forward portion and the aft portion includes a gear bearing surface with an axial width that matches an axial width of a corresponding one of the forward gear portion and the aft gear portion.

In a further embodiment of any of the foregoing turbine engine assemblies, each of the plurality of journal bearings includes a forward portion that supports the forward gear portion, an aft portion supports the aft gear portion, and a middle portion and each of the forward portion and the aft portion includes a gear bearing surface with an axial width that is greater than an axial width of the corresponding one of the forward gear portion and the aft gear portion.

In a further embodiment of any of the foregoing turbine engine assemblies, each of the forward portion and the aft portion include an outer undercut and an inner undercut. The outer undercut faces axially outward and the inner undercut faces axially inward toward the middle portion. The outer undercut and the inner undercut have equal axial lengths.

Although the different examples have the specific components shown in the illustrations, embodiments of this invention are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
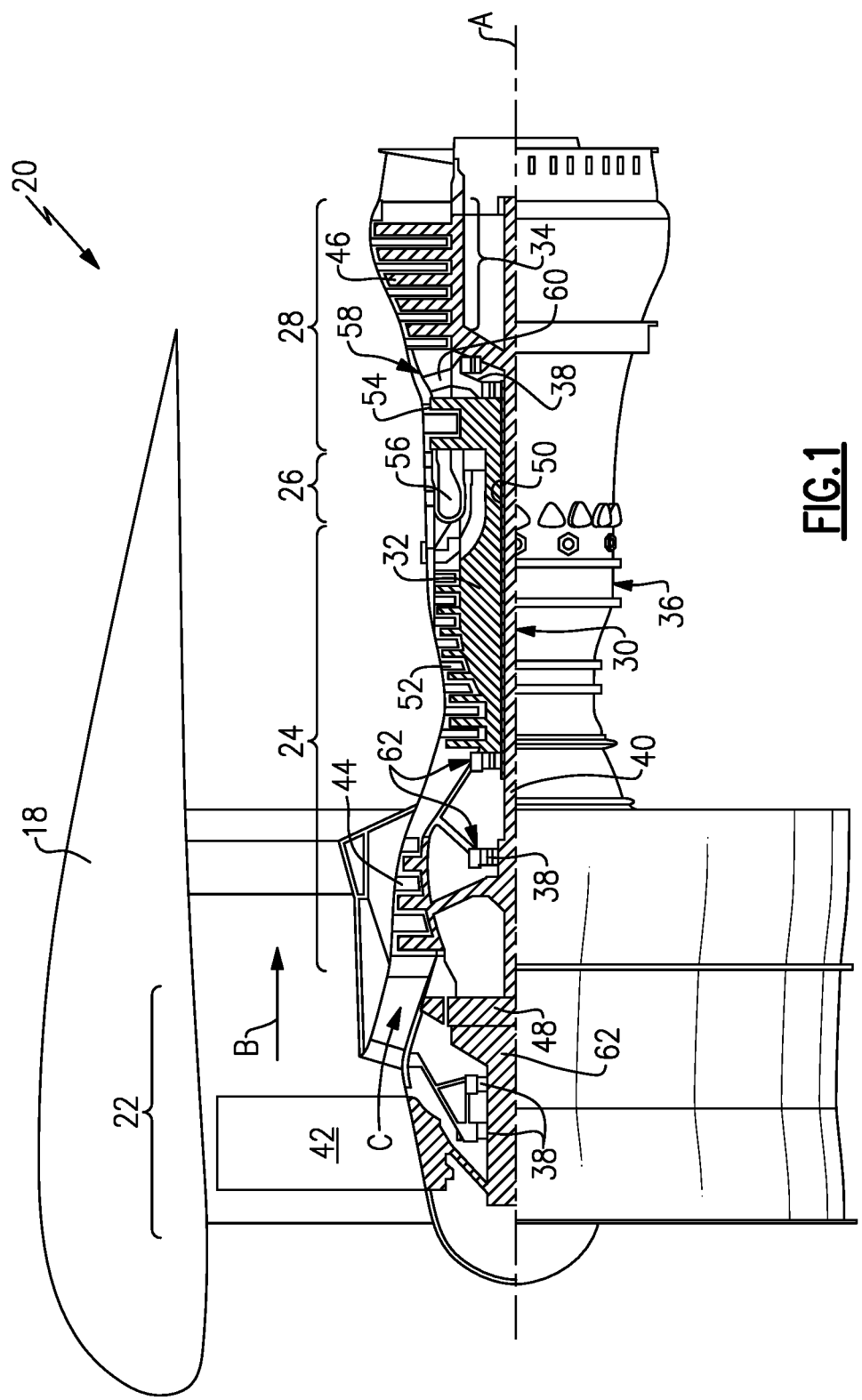
FIG. 1 is a schematic view of an example gas turbine engine including a planetary fan drive gear system.

FIG. 1 schematically illustrates a gas turbine engine 20 with an epicyclic fan drive gear system 48 having a compound intermediate gear and an elongated journal bearing. The intermediate gear and elongated journal bearing are supported in a rotatable carrier coupled to a fan drive shaft 62 for driving a fan section 22. The example fan drive gear system 48 provides high gear ratios and is configured to operate within a limited design space.

The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 18, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures, turbofans, turboprop, open rotor configurations and any other gas turbine engine architecture.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to a fan section 22 through a speed change mechanism, which in exemplary gas turbine engine 20 is illustrated as the fan drive gear system 48 to drive the fan section 22 at a lower speed than the low speed spool 30. The high speed spool 32 includes an outer shaft 50 that interconnects a second (or high) pressure compressor 52 and a second (or high) pressure turbine 54. The low pressure turbine 46 includes a plurality of turbine rotors 34. A combustor 56 is arranged in exemplary gas turbine 20 between the high pressure compressor 52 and the high pressure turbine 54. A mid-turbine frame 58 of the engine static structure 36 may be arranged generally between the high pressure turbine 54 and the low pressure turbine 46. The mid-turbine frame 58 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 58 includes airfoils 60 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, the fan drive gear system 48 may be located aft of the low pressure compressor 44, or aft of the combustor section 26 or even aft of turbine section 28, and fan section 22 may be positioned forward or aft of the fan drive gear system 48.

The engine 20 in one example is a high-bypass geared aircraft engine. the example engine 20 includes a bypass ratio greater than 20, with an example embodiment being greater than 32 and less than 72.

The fan drive gear system 48 is an epicycle gear train with a gear reduction ratio of greater than about 5:1 and less than about 18:1. In another example embodiment, the fan drive gear system 48 provides a gear reduction ratio of between 8:1 and 13.5:1. The gear system 48 is coupled to the fan shaft 62 to drive the fan section 22 about the engine axis A. It should be understood, however, that the above parameters are only exemplary of one embodiment of a geared engine architecture and that the present disclosure is applicable to other gas turbine engine architectures including turbofan, turboshaft and open rotor engines.

Figure 3:
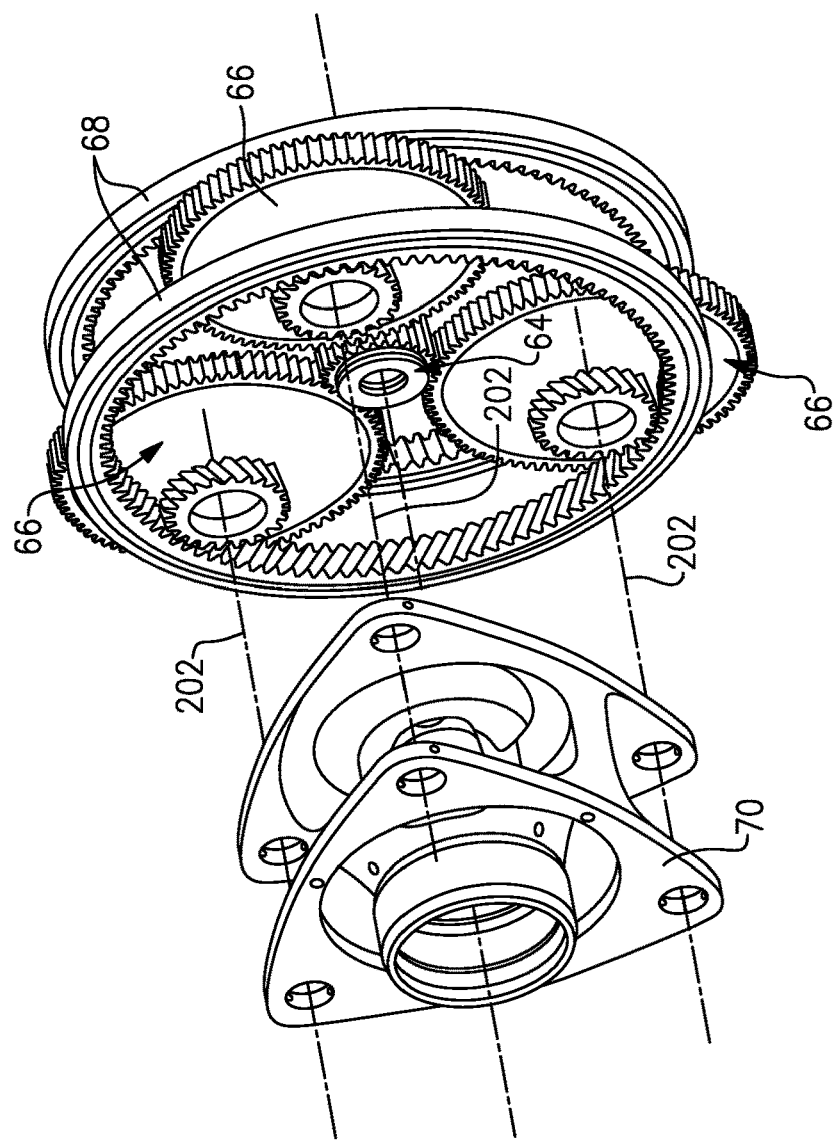
FIG. 3 is a partial exploded view of the example fan drive gear system.
Figure 2:
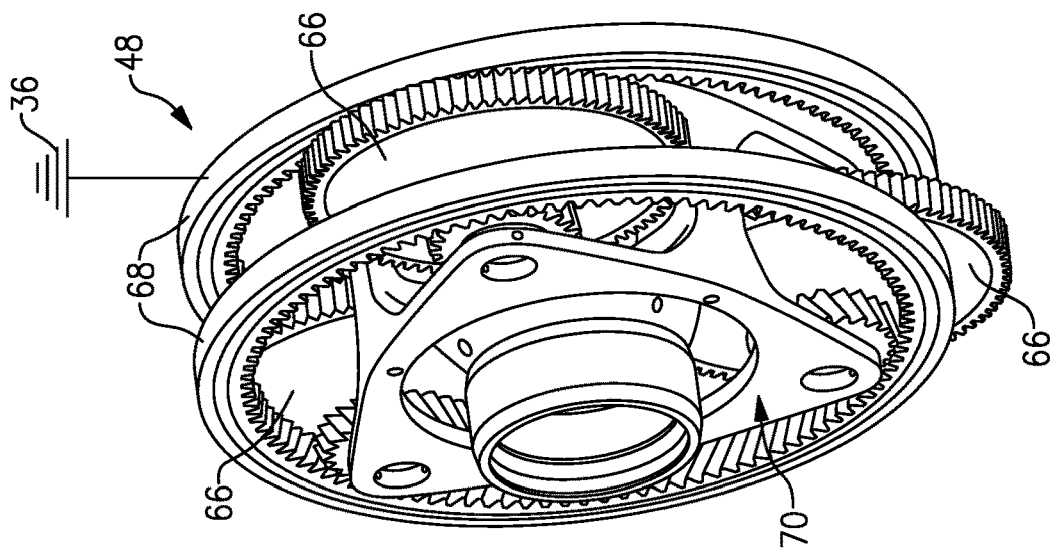
FIG. 2 is an enlarged schematic view an example fan drive gear system embodiment.

Referring to FIGS. 2 and 3 with continued reference to FIG. 1, the example fan drive gear system 48 is an epicyclic gear system with a sun gear 64 engaged to a plurality of compound intermediate gears 66 supported by a rotating carrier 70. A ring gear assembly 68 circumscribes the intermediate gears 66 and is fixed to a static engine structure 36.

The intermediate gears 66, also referred to as planet gears, are compound gears that have two or more gear interfaces of different sizes that are fixed together and rotate at a common speed. In one disclosed example, three (3) intermediate gears 66 are supported by the carrier 70 and rotate about a corresponding one of axes 202. Each of the intermediate gears 66 include a gear interface with the sun gear 64 and a gear interface with the fixed ring gear assembly 68.

Figure 4:
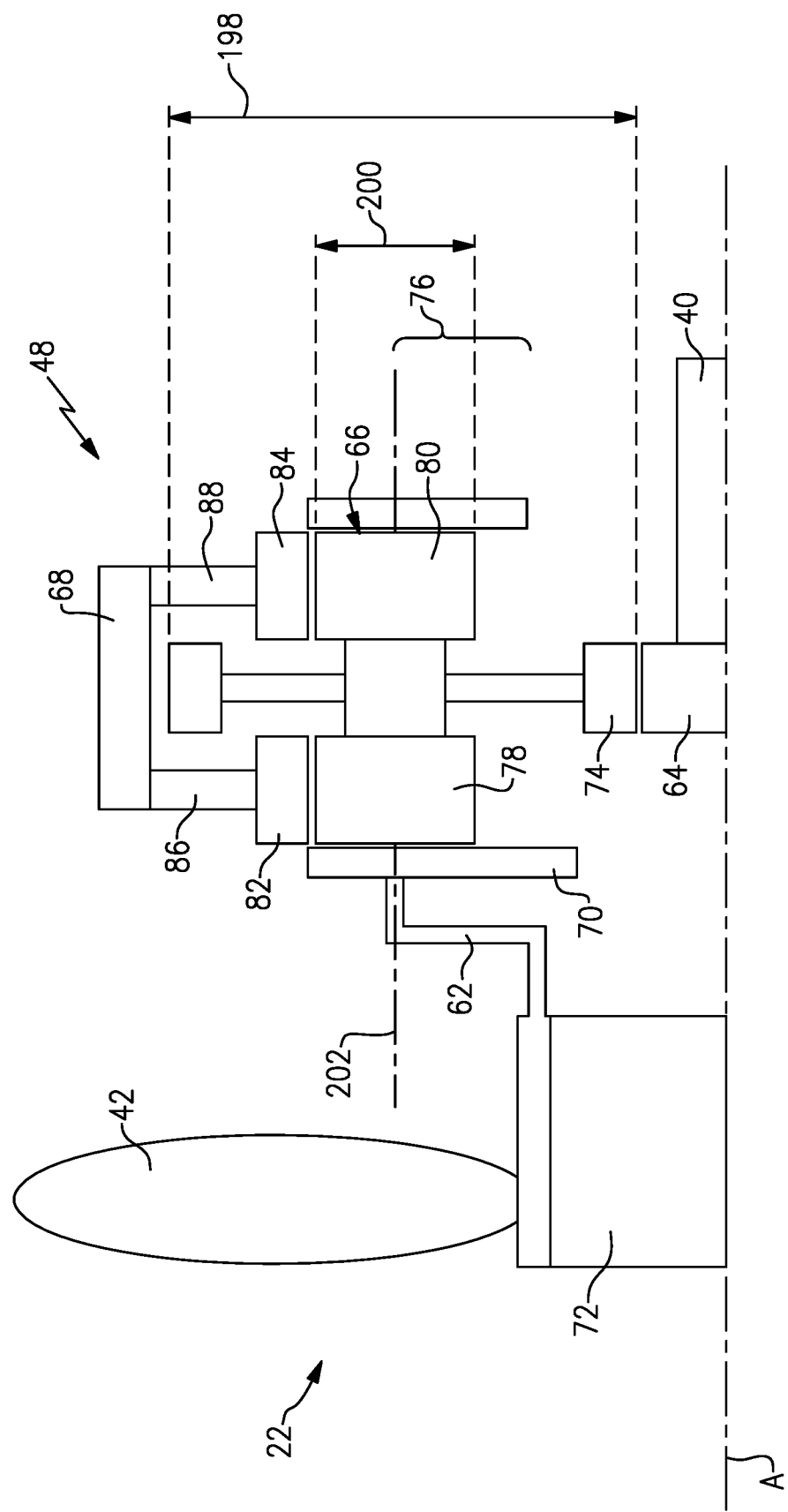
FIG. 4 is a schematic view of an example fan drive gear system.

Referring to FIG. 4, the example gear system 48 is shown in a simplified schematic view that illustrates gear interfaces with a single compound intermediate gear 66. The example compound intermediate gear 66 includes a first gear portion 74 and a second gear portion 76. The first gear portion 74 is engaged to the sun gear 64. In the illustrated example, the sun gear 64 is driven by the inner shaft 40 that is coupled to the LPT 46. Although the inner shaft 40 is shown by way of example as the driving input, other engine shafts could be coupled to the sun gear 64 to provide the driving input.

The first gear portion 74 includes a first diameter 198 and the second gear portion 76 includes a smaller second diameter 200. The first diameter 198 and the second diameter 200 represent relative diameters that are tailored to provide a desired gear reduction through the gear system. Moreover, gears have several different diameters that are utilized for different purposes and reflect different gear geometric portions. Accordingly, the example diameters 198, 200 may be any diameter commonly utilized to describe a gear. For example, pitch diameter, tip diameter, root diameter and/or reference diameter.

The second gear portion 76 includes a forward gear portion 78 and an aft gear portion 80. The second gear portion 76 is split to enable a larger overall gear face width 90 to accommodate torque transmitted through the intermediate gear 66. The forward and aft gear portions 78, 80 are engaged to the ring assembly 68. The ring assembly 68 includes a forward ring gear 82 and an aft ring gear 84 that are each engaged to a corresponding part of the second gear portion 76. The forward ring gear 82 and the aft ring gear 84 are supported by a corresponding one of a forward web portion 86 and an aft web portion 88.

The compound intermediate gear 66 is supported by the carrier 70. The carrier 70 is coupled to the fan shaft 62. The fan shaft 62 is coupled to a fan hub 72 that supports the plurality of fan blades 42. The specific structure of the fan section 22 may differ from the disclosed example and remain within the scope and contemplation of this disclosure.

Figure 5:
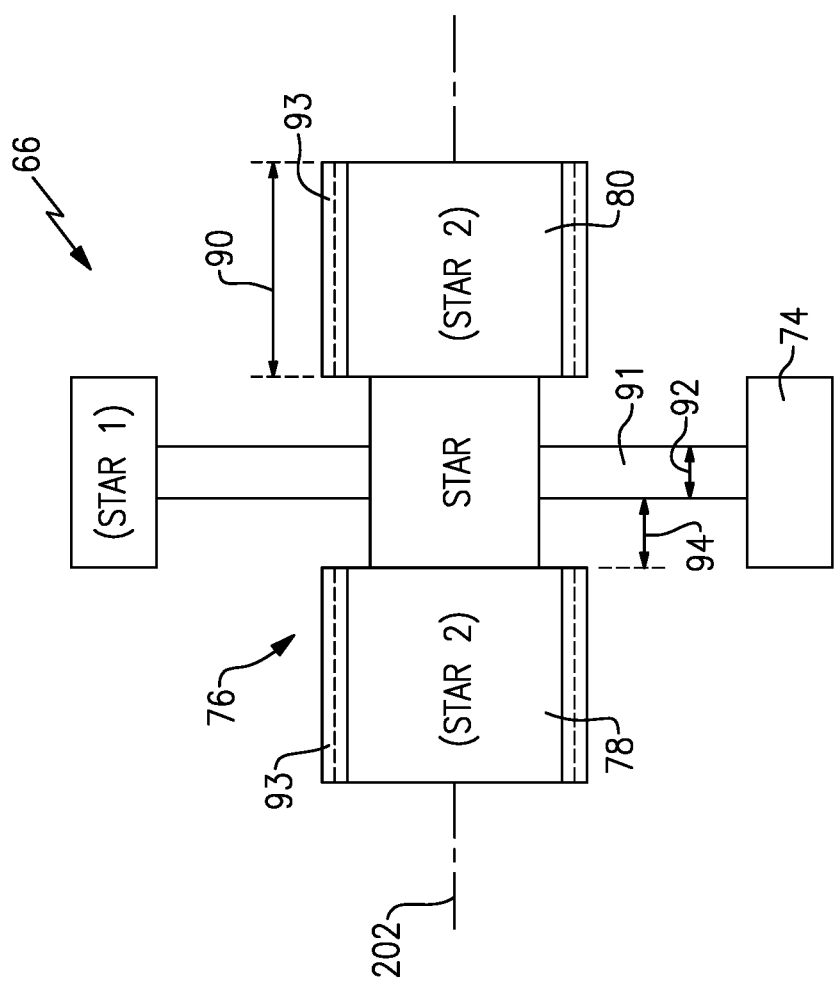
FIG. 5 is a schematic view of an example compound intermediate gear embodiment.

Referring to FIG. 5, the compound intermediate gear 66 include a web portion 91 that supports the first gear portion 74 between the forward gear portion 78 and the aft gear portion 80. The web portion 91 includes a width 92 and is spaced a distance 94 apart from either of the forward gear portion 78 and the aft gear portion 80. The width 92 and distance 94 provide for manufacture of gear teeth, schematically indicated at 93, for the entire face width 90 of each of the forward and aft gear portions 78, 80.

The example compound intermediate gear 66 is a one-piece part with integrally formed gear portions 74, 76. However, a multi-part compound intermediate gear could also be utilized and is within the contemplation of this disclosure.

The distance 94 provides a clearance space for a rotating tool to form gear teeth schematically shown at 93 along the entire face width. The specific distance 94 and width 92 is tailored to gear specific configurations for a specific gear system configuration. In one disclosed example embodiment, the clearance 94 is between about 0.75 inches and 1.50 inches. In another example embodiment, the clearance 94 is between about 0.80 inches and 1.25 inches. In still another example embodiment, the clearance 94 is greater than about 0.80 inches. Although specific clearances are provided by way of example, other clearances may be utilized depending on manufacturing processes utilized for fabrication of the intermediate gear 66.

In one example embodiment, the axial width 92 of the web portion 91 is between 10% and 25% of the axial face width 74. In another example embodiment, the axial width 92 is about 15% of the axial face width 74. Although specific proportions are disclosed by way of example, other relative proportions could be utilized and are within the contemplation of this disclosure.

Figure 6:
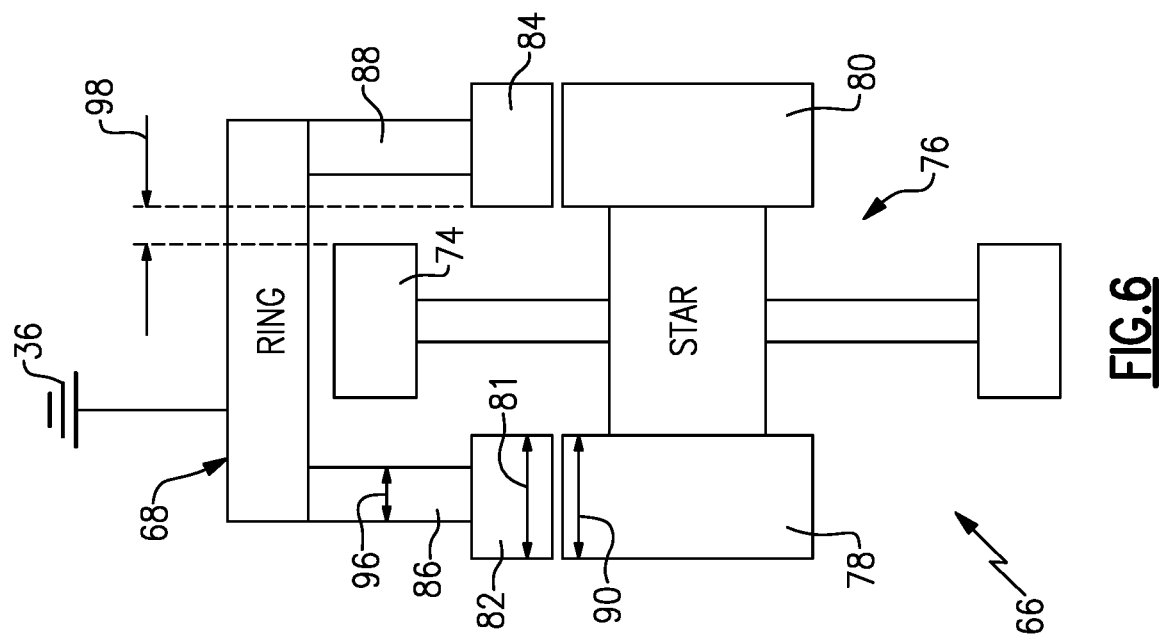
FIG. 6 is a schematic view of an example compound intermediate gear and ring gear assembly embodiment.

Referring to FIG. 6 with continued reference to FIG. 5, the ring gear assembly 68 includes ring gear portions 82, 84 that are spaced a distance 98 from the first gear portion 74. The webs 86, 88 each include a width 96 and support the corresponding forward ring gear portion 82 and an aft ring gear portion 84. The distance 98 defines a minimum clearance between portions of the fixed ring gear assembly 68 and the rotating intermediate gear 66. The distance 98 may be between 0.08 and 0.18 inches. In still another example embodiment, the clearance 98 is greater than about 0.80 inches. Although an example clearance is disclosed, other distances may be utilized to accommodate application specific requirements and fabrication processes. In one disclosed example embodiment, the two sides of the ring gear assembly 68 are connected; however, the example ring gear assembly 68 may include separate portions. Moreover, in one example embodiment, each ring gear portion 82, 84 is attached directly to the engine static structure 36 and not directly connected to each other.

The forward ring gear portion 82 and the aft ring gear portion 84 each includes a face width 81 that is proportional to the axial width 90 of the forward and aft gear portions of the intermediate gear 66. In one disclosed embodiment, the width 96 is between 10% and 25% of the face width 81. In another example embodiment the width 96 is about 15% of the face width 81. Face width 81 is between 80% and 100% of Face width 90 in one embodiment, and between 85% and 95% of face width 90 in another embodiment.

Figure 7:
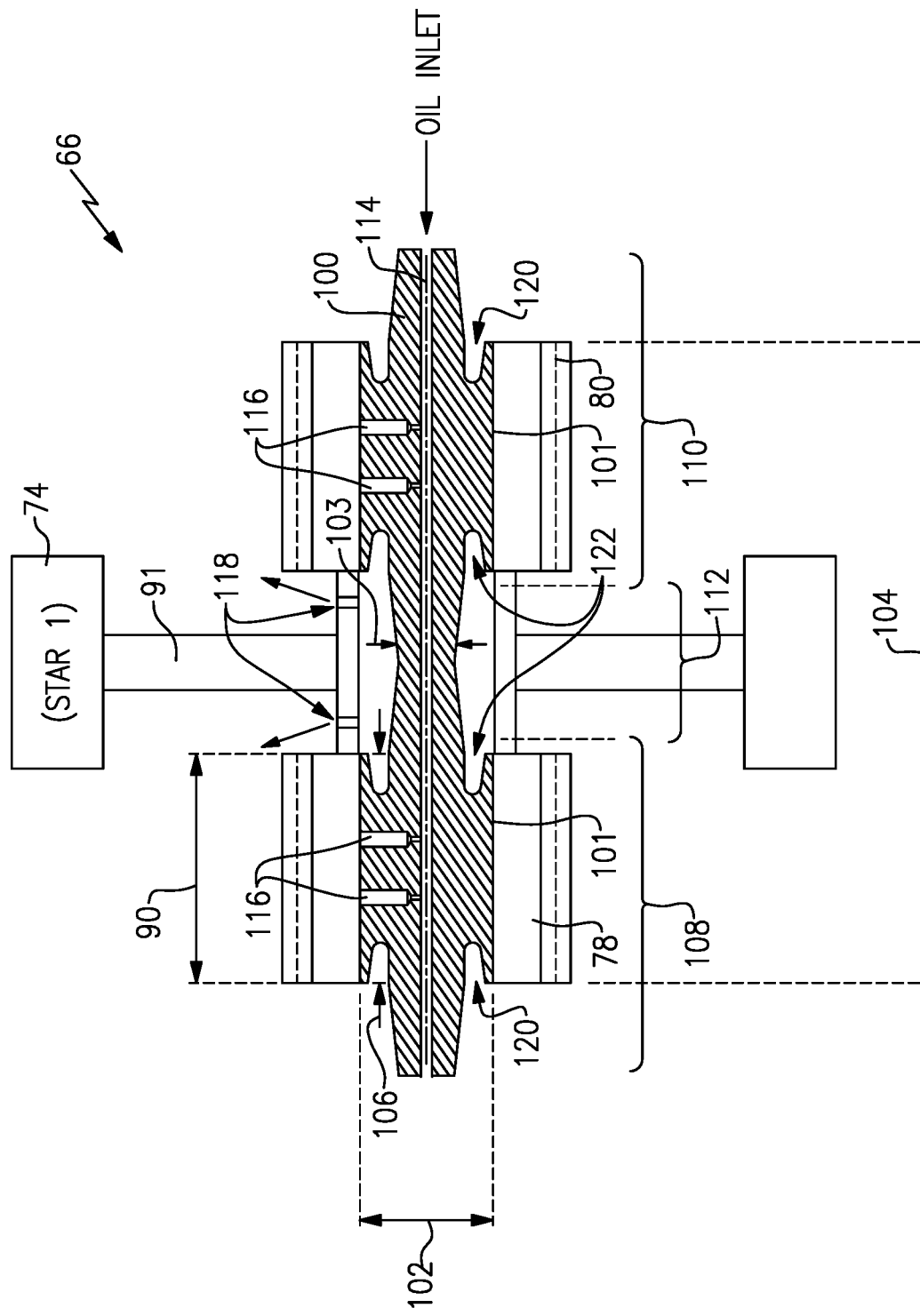
FIG. 7 is a schematic view of an example journal bearing for supporting rotation of the example compound intermediate gear.

Referring to FIG. 7, an intermediate gear 66 is shown with an example journal bearing 100. The journal bearing 100 includes an elongated length 104 to accommodate the increased axial width of the intermediate gear 66. The journal bearing 100 further includes an outer diameter 102 that corresponds to a bearing surface 101. The increased length 104 is reflected as a ratio between the length 104 and the outer diameter 102. In one example embodiment, a ratio of the length 104 to the outer diameter 102 is between 1.5 and 6. In another example embodiment, the ratio of the length 104 to the outer diameter 102 is between 2 and 4.

The journal bearing 100 is illustrated as a one-piece part with features for supporting corresponding forward and aft gear portions 78, 80 of the intermediate gear 66. The example journal bearing 100 includes a forward portion 108, an aft portion 110 and a middle portion 112. The forward and aft portions 108, 110 support a corresponding forward and aft gear portion 78, 80. The journal bearing 100 includes a main lubricant passage 114 and radial lubricant passages 116 arranged to communicate a lubricant flow to rotating interfaces. Outlets 118 through the intermediate gear 66 for exhausting lubricant flow. In the disclosed example, the outlets 118 are provided between the web 91 and one of the forward and aft gear portions 78, 80.

The forward and aft portions 108, 110 have the bearing surface 101 with a length 106. The length 106 corresponds with the width 90 of each of the forward and aft gear portions 78, 80. Each of the bearing portions 108, 110 include outer undercuts 120 and inner undercuts 122. The outer and inner undercuts 120, 122 enable tailoring of a stiffness of the journal bearing 100.

The middle portion 112 of the example journal bearing 100 includes a reduced outer diameter 103 as compared to the outer diameter 102 of the bearing surfaces 101. The bearing surfaces 101 in this example are spaced apart from the inner gear surface that corresponds with the first gear portion 74. In one example embodiment, the intermediate gear 66 may provide sufficient stiffness for loads on the first gear portion 74 so as to not require support by the journal bearing 100.

Figure 8:
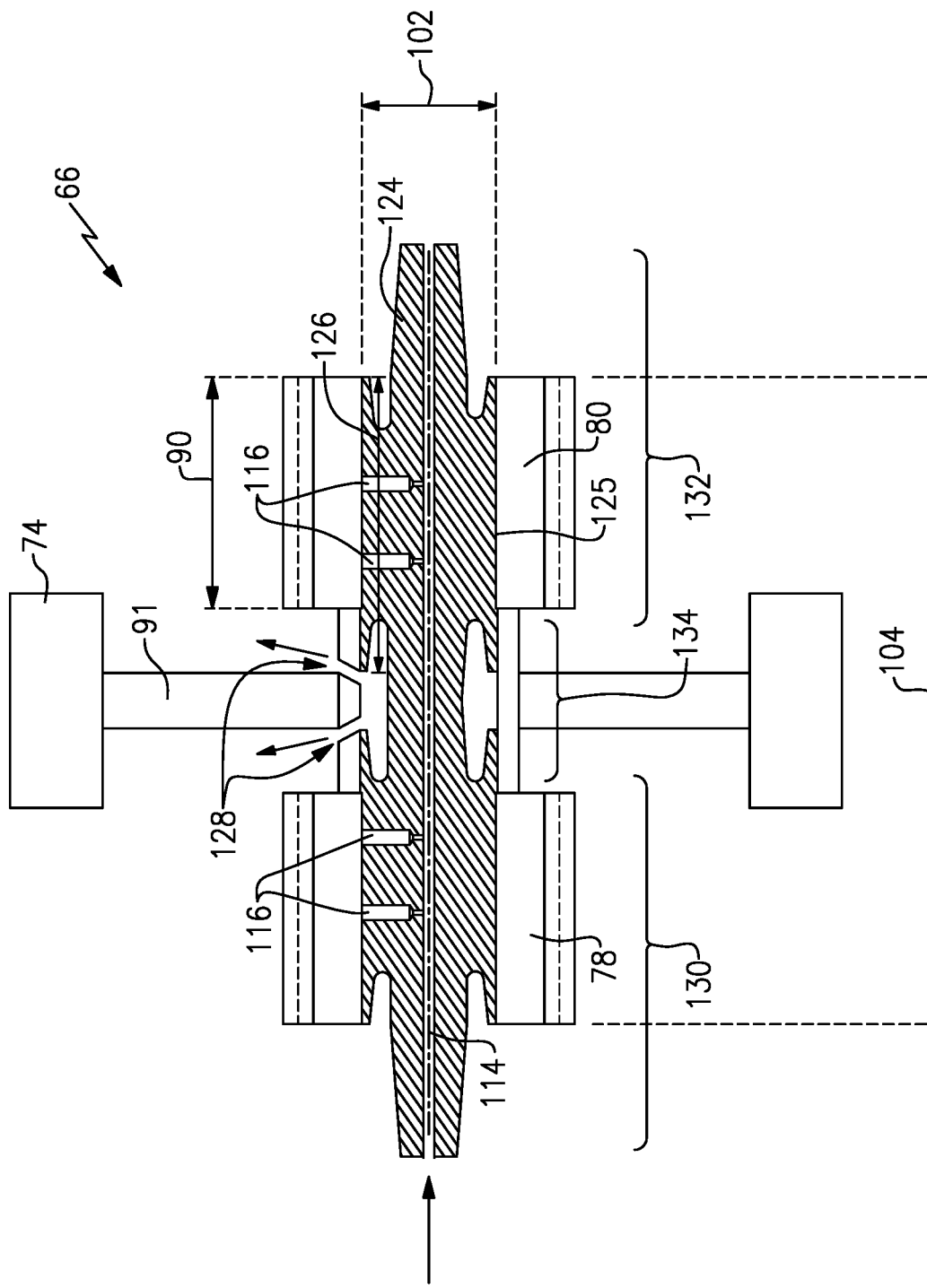
FIG. 8 is a schematic view of another example journal bearing for supporting rotation of the example compound intermediate gear.

Referring to FIG. 8, another example journal bearing 124 is shown with forward and aft portions 130, 132 with a bearing surface 125 of a length 126. The length 126 extends inwardly to support the first gear portion 74. The middle portion 134 is smaller with the wider forward and aft portions 130, 132 that correspond to the increased length of the bearing surface 125.

In one disclosed example embodiment, the forward portion 130 and the aft portion 132 includes a gear bearing surface 125 with the axial width 126 greater than the axial face width 90 of the corresponding one of the forward gear portion 78 and the aft gear portion 80.

The journal bearing 124 includes the same main lubricant passage 114 that supplies radial passages 116. Outlets 128 are provided on either side of the web 91 and are located further inward to accommodate the increased length of the bearing surface 126. The example journal bearing 124 maintains the increased length 104 relative to the diameter 102 of the bearing surface 126.

Figure 9:
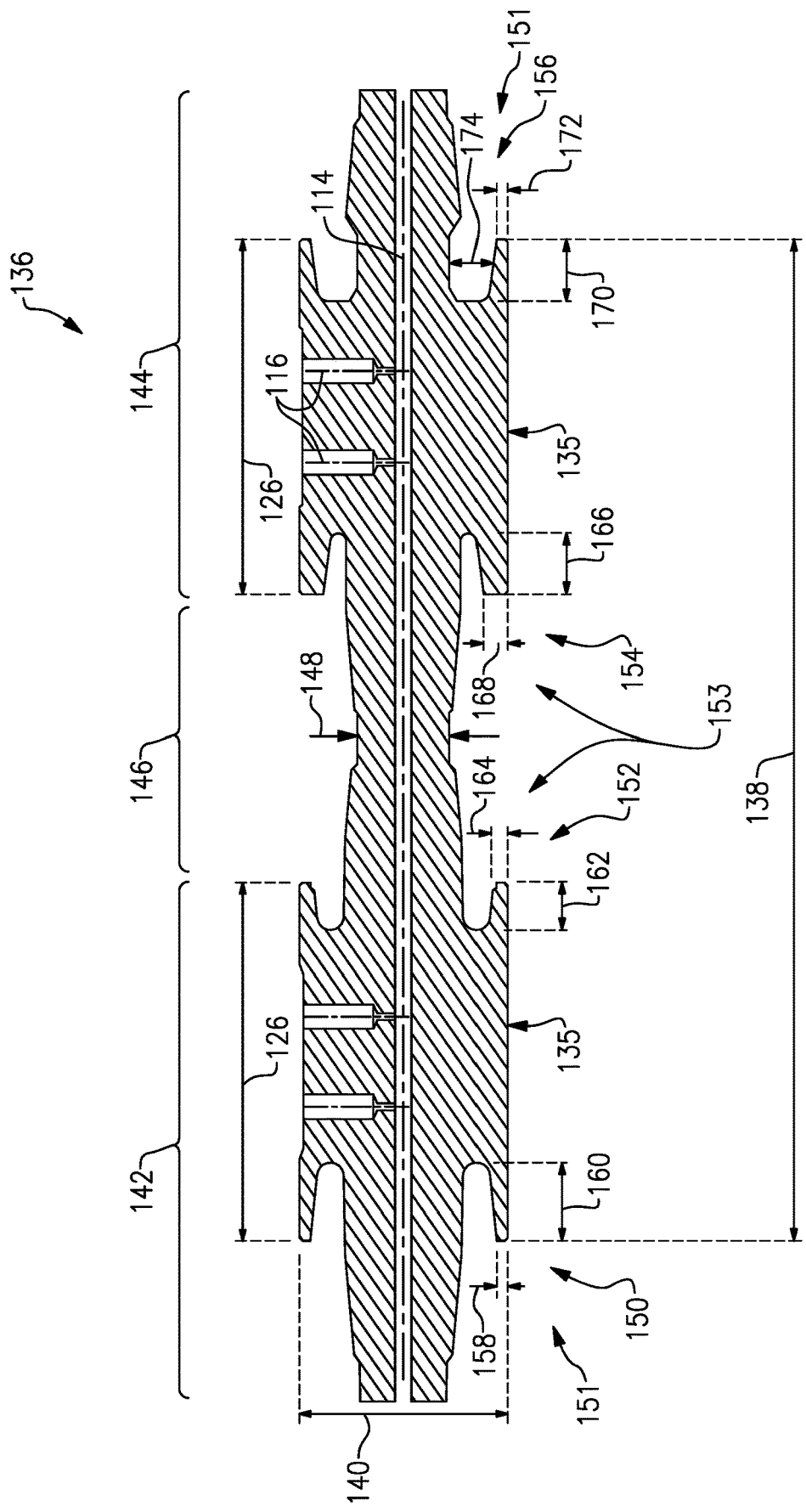
FIG. 9 is a cross-sectional of an yet another example journal bearing embodiment.

Referring to FIG. 9 another journal bearing 136 is shown that illustrates different undercut configuration embodiments. The example journal bearing 136 includes a middle portion 146 with a smaller outer diameter 148 than the outer diameter 140 of the bearing surfaces 135. The length 138 and outer diameter 140 are related by the previously disclosed ratios. The main lubricant passage 114 and radial lubricant passage 116 are shown and provided lubricant to the bearing surfaces 135.

The configuration of the undercuts is tailored to generate a desired stiffness of the journal bearing 136 to accommodate loads. Moreover, although the previous disclosed and described journal bearings 100, 124 were generally symmetrical about the axis of rotation and between forward and aft portions, the journal bearing may be asymmetric to accommodate loads that may be biased forward or aft from an axial centerline of the intermediate gear 66.

The example journal bearing 136 illustrates various different geometries for undercuts that may be utilized to tailor stiffness of the bearing surfaces 135 to accommodate operational gear loads. The example undercut 150 includes a thickness 158 and length 160 that is formed by the removal of material to define a gap. The thickness 158 and length 160 are tailored to define a stiffness of the journal bearing 136. The undercut lengths 160, 162, 166, 170 are individually proportional to the journal bearing surface length 126. In one example embodiment, the ratio of bearing surface length 126 to a single undercut length 160, 162, 166, 170 is between 4 and 7. In another example, the ratio of bearing surface length 126 to undercut length 160, 162, 166, 170 is between 3 and 10.

The undercut 152 is shown with a length 162 that is smaller than that of the undercut 150. The undercut 152 further includes a thickness 164 that is substantially the same as that of the undercut 150. The change in length of the undercut 152 increases stiffness of the bearing surface 135.

Another example undercut 154 includes a length 166 and thickness 168. In this example undercut 154, thickness 168 is increased over the undercut 150 to provide the desired modification to stiffness. The length 166 may be the same as the length 160 but the undercut 154 provides an increase in stiffness due to the increased thickness 168.

Another example undercut 156 is illustrated with an increased radius cutout area 174. The undercut 156 includes a thickness 172 and length 170 that are substantially the same as the undercut 150. However, the increased radius cutout area 174 provides a different stiffness.

In one disclosed example, each of the forward portion 142 and the aft portion 144 include an outer undercut 151 and an inner undercut 153. The outer undercuts 151 face axially outward and the inner undercuts 153 face axially inward toward the middle portion 146. The axial lengths 162, 166 of the inner undercuts 153 are different than the axial lengths 160, 170 of at least one of the outer undercuts 151.

In another disclosed example embodiment, each of the forward portion 142 and the aft portion 144, a radial thickness 164, 168 of at least one of the inner undercuts 153 is different than the radial thickness 158, 172 of at least one of the outer undercuts 151.

Several example cutout configurations are shown by way of example, however other combination of thickness, length and radial cutout area could be implemented to adjust stiffness to accommodate application specific gear loads. Moreover, although each of the thickness, length, and radial cutout areas are shown as symmetric about a rotational axis, each feature may be asymmetric about the rotational axis Such other combinations are within the contemplation and scope of this disclosure.

Figure 10:
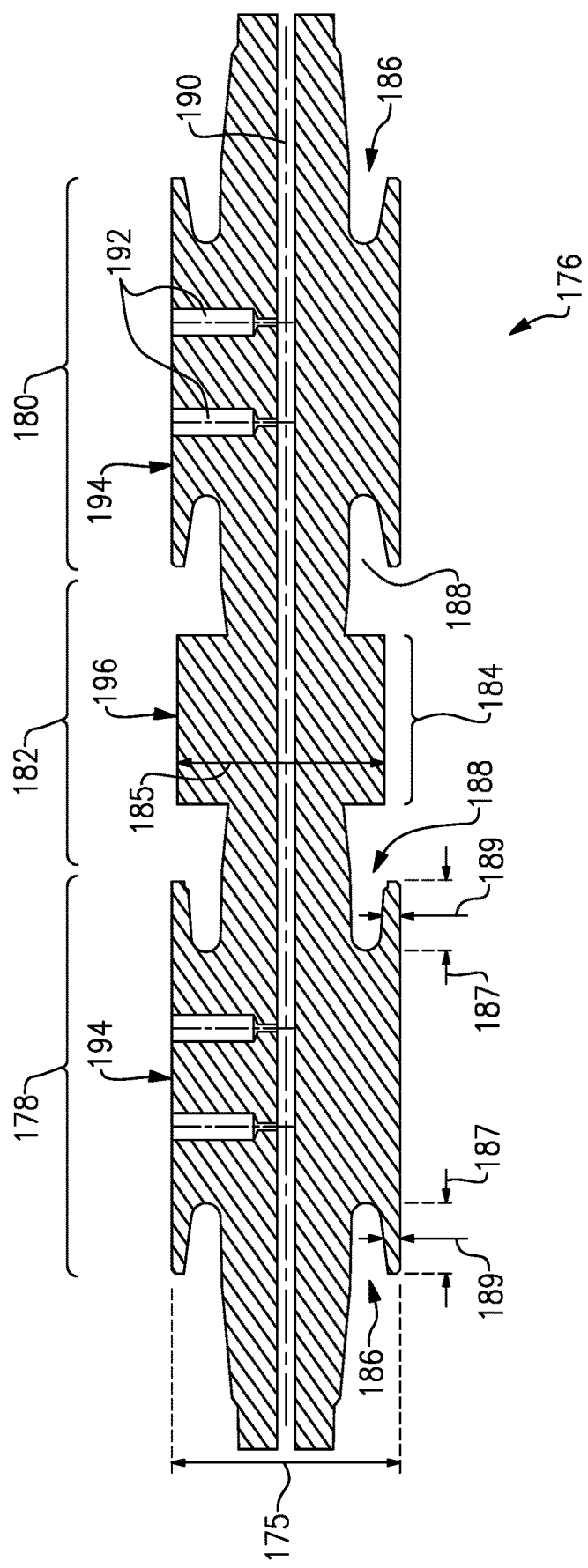
FIG. 10 is a cross-sectional view of still another example journal bearing embodiment.

Referring to FIG. 10, another example journal bearing 176 is shown that includes a forward portion 178, an aft portion 180 and a middle portion 182. The example middle portion 182 includes a center support area 184 with an outer diameter 185. The outer diameter 185 may be the same or substantially the same as outer diameter of bearing surfaces 194. The center support area 184 includes a center bearing surface 196. The center bearing surface 196 provides support for the first gear portion of the compound intermediate gear 66. The center bearing surface 196 may also be utilized to adjust overall stiffness.

The journal bearing 176 includes outer undercuts 186 and inner undercuts 188. The outer undercuts 186 open outward toward ends of the journal bearing 176. The inner undercuts 188 open inward toward the middle area 182 and each other.

In one disclosed example journal bearing 176, each of the forward portion 178 and the aft portion 180 include an outer undercut 186 and an inner undercut 188. The outer undercut 188 faces axially outward and the inner undercut 188 faces axially inward toward the middle portion 182. The example outer undercut 186 and the example inner undercut 186 have equal axial lengths 187 and equal radial thicknesses 189.

The example outer undercuts 186 and inner undercuts 188 are configured the same. However, the outer undercuts 186 and the inner undercuts 188 may be configured differently to accommodate localized loading and remain within the scope and contemplation of this disclosure. The middle Section 184 may also have undercuts similar to 186, 188 in order to modify stiffness. The middle section 184 may also include radial lubricant passages similar to 192 if the surface 196 is utilized as a bearing surface.

Accordingly, the example compound intermediate gear and example journal bearings includes features that accommodate increased gear loading within a limited design space.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A fan drive gear system for a turbine engine comprising:
   a sun gear configured to be driven by an engine shaft rotatable about an axis;
   a plurality of compound intermediate gears, wherein each of the plurality of intermediate gears includes a first gear portion and a second gear portion, wherein the second gear portion comprises a forward gear portion and an aft gear portion;
   a ring gear assembly including a forward ring gear engaged to the forward gear portion of each of the plurality of compound intermediate gears and an aft ring gear engaged to the aft gear portion of each of the plurality of compound intermediate gears;
   a carrier supporting rotation of the plurality of intermediate gears; and
   a plurality of journal bearing assemblies corresponding with the plurality of intermediate gears, wherein each of the plurality of journal bearing assemblies comprises;
      a forward portion supporting the forward gear portion of a corresponding one of the plurality of compound intermediate gears,
      an aft portion supporting the aft gear portion of a corresponding one of the plurality of compound intermediate gears,
      a middle portion,
      an outer undercut on each of the forward portion and the aft portion facing axially outward, an inner undercut on each of the forward portion and the aft portion facing axially inward toward the middle portion, and
      a ratio of a journal length to a journal diameter that is between 1.5 and 6.

2. The fan drive gear system as recited in claim 1, wherein the ring gear assembly is fixed to a static engine structure and the carrier is rotatable about the axis.

3. The fan drive gear system as recited in claim 1, wherein the ring gear assembly includes a forward web portion supporting the forward ring gear and an aft web portion supporting the aft ring gear and each of the forward web portion and the aft web portion include an axial width that is between 10% and 25% of an axial width of each of the forward ring gear and the aft ring gear.

4. The fan drive gear system as recited in claim 1, wherein an axial clearance between the first gear portion of each of the plurality of compound intermediate gears and each of the forward ring gear and the aft ring gear is greater than 0.80 inches.

5. The fan drive gear system as recited in claim 1, wherein each of the plurality of compound intermediate gear include at least one lubricant exhaust opening between the forward gear portion and the aft gear portion.

6. The fan drive gear system as recited in claim 5, wherein a radial thickness of the inner undercuts and the outer undercuts are the same.

7. The fan drive gear system as recited in claim 5, wherein for each of the plurality of journal bearing assemblies, the middle portion comprises a bearing surface supporting the first gear portion of a corresponding one of the plurality of compound intermediate gears.

8. The fan drive gear system as recited in claim 5, wherein for each of the plurality of journal bearing assemblies, the middle portion comprises an outer diameter that is less than each of the forward portion and the aft portion.

9. The fan drive gear system as recited in claim 1, wherein each of the forward portion and the aft portion of each of the plurality of journal bearing assemblies comprises a gear bearing surface with an axial width matching an axial width of a corresponding one of the forward gear portion and the aft gear portion.

10. The fan drive gear system as recited in claim 1, wherein each of the forward portion and the aft portion of each of the plurality of journal bearing assemblies comprises a gear bearing surface with an axial width greater than an axial width of the corresponding one of the forward gear portion and the aft gear portion.

11. The fan drive gear system as recited in claim 1, wherein the outer undercuts and the inner undercuts have equal axial lengths.

12. The fan drive gear system as recited in claim 1, wherein an axial length of the inner undercuts is different than that of the outer undercuts.

13. The fan drive gear system as recited in claim 1, wherein a radial thickness of the inner undercuts is different than that of the outer undercuts.

14. The fan drive gear system as recited in claim 1, wherein each of the plurality of journal bearing assemblies includes at least one lubricant supply hole configured to transfer lubricant to an interface with an inner surface of a corresponding one of the plurality of compound intermediate gears.

15. A turbine engine assembly comprising:
   a static engine structure;
   a fan section including a plurality of blades rotatable about an axis;
   a fan drive gear system including:
      a sun gear configured to be driven by an engine shaft rotatable about the axis;
      a plurality of compound intermediate gears, wherein each of the plurality of intermediate gears includes a first gear portion and a second gear portion, wherein the second gear portion comprises a forward gear portion and an aft gear portion;

a ring gear assembly including a forward ring gear engaged to the forward gear portion and an aft ring gear engaged to the aft gear portion, the ring gear assembly fixed to the static engine structure;

a carrier supporting rotation of the plurality of intermediate gears, the carrier rotatable about the axis; and a plurality of journal bearing assemblies corresponding with the plurality of intermediate gears, wherein each of the plurality of journal bearing assemblies comprises a ratio of a journal length to a journal diameter that is between 1.5 and 6 and wherein each of the plurality of journal bearing assemblies includes a plurality of lubricant supply holes that are configured to communicate lubricant to an interface with an inner surface of a corresponding one of the plurality of compound intermediate gears and each of the plurality of compound intermediate gears includes an outlet for exhausting lubricant flow that is disposed between the forward gear portion and the aft gear portion, wherein each of the plurality of journal bearing assemblies includes a forward portion, an aft portion, and a middle portion and wherein each of the forward portion and the aft portion includes a gear bearing surface with an axial width matching an axial width of a corresponding one of the forward gear portion and the aft gear portion of a corresponding one of the plurality of compound intermediate gears, and wherein each of the forward portions and the aft portions include an outer undercut and an inner undercut, the outer undercut facing axially outward and the inner undercut facing axially inward toward the middle portion, wherein the outer undercut and the inner undercut have equal axial lengths; and a fan drive shaft coupled to the carrier.

16. The turbine engine assembly as recited in claim 15, wherein the ring gear assembly includes a forward web portion supporting the forward ring gear and an aft web portion supporting the aft ring gear and each of the forward web portion and the aft web portion include an axial width that is between 10% and 25% of an axial width of each of the forward ring gear and the aft ring gear.

* * * * *